United States Patent [19]

Kikuchi et al.

[11] Patent Number: 4,815,837
[45] Date of Patent: Mar. 28, 1989

[54] ACTUATOR UNIT HOUSING FOR REARVIEW MIRROR

[75] Inventors: Toshiaki Kikuchi; Toshihiro Mochizuki, both of Shizuoka, Japan

[73] Assignee: Murakami Kaimeido Co., Ltd., Shizuoka, Japan

[21] Appl. No.: 126,224

[22] Filed: Nov. 25, 1987

[30] Foreign Application Priority Data

Nov. 26, 1986 [JP] Japan .............. 61-180487[U]

[51] Int. Cl.$^4$ .................. G02B 7/18; H01R 13/58
[52] U.S. Cl. .................. 350/637; 248/487; 350/634; 350/636; 439/34; 439/456; 439/459
[58] Field of Search ............... 350/604, 637, 632, 633, 350/634, 636; 439/34, 456, 457, 458, 459; 248/487

[56] References Cited

U.S. PATENT DOCUMENTS

| | | | |
|---|---|---|---|
| 3,775,729 | 11/1973 | Casper | 439/459 |
| 3,879,571 | 4/1975 | Reed | 439/456 |
| 3,981,555 | 9/1976 | Deurloo | 439/456 |
| 4,101,189 | 7/1978 | Moser et al. | 439/456 |
| 4,224,465 | 9/1980 | Ruzic | 439/459 |
| 4,350,839 | 9/1982 | Lass | 439/457 |
| 4,498,738 | 2/1985 | Kumai | 350/637 |
| 4,626,083 | 12/1986 | Nakayama et al. | 350/637 |
| 4,626,084 | 12/1986 | Kumai | 350/637 |
| 4,693,571 | 9/1987 | Kimura et al. | 350/637 |
| 4,696,555 | 9/1987 | Enomoto | 350/637 |

Primary Examiner—John K. Corbin
Assistant Examiner—Martin Lerner
Attorney, Agent, or Firm—Michael J. Striker

[57] ABSTRACT

The actuator unit housing for a rearview mirror includes two electric motors for tilting a mirror element in an actuator unit, and a drive transmission, and means for foldably supporting a mirror element on the upper surface of the actuator housing. A guide inlet for inserting an electric supply and control harness line of the motors is formed in the actuator unit housing. Since the guide inlet is composed of a plurality of lateral slits with labyrinths, the movement of the harness line occurred when the actuator is assembled or repaired can be suppressed. When a connector socket is buried in the slit, the socket is positioned by the labyrinth, and even if an external force by engaging a plug piece is applied, the socket can be stably held.

11 Claims, 3 Drawing Sheets

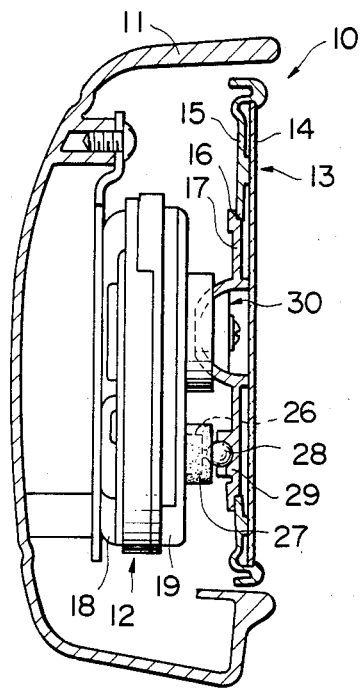
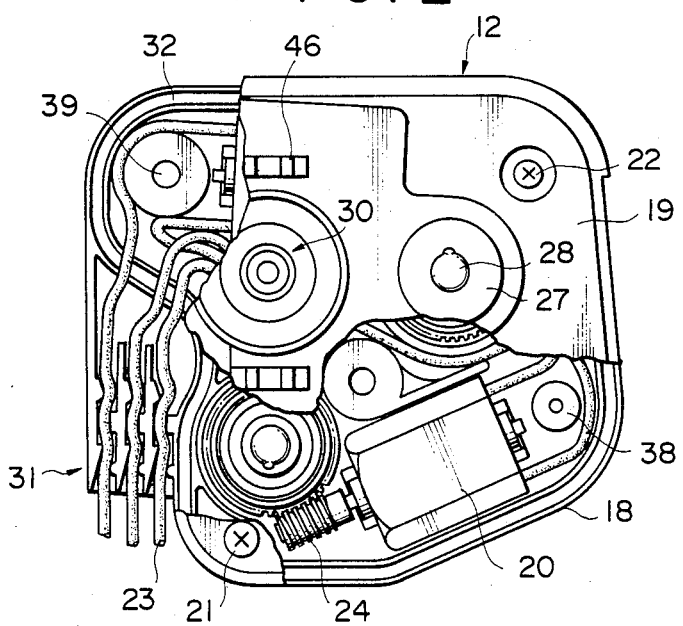

ACTUATOR UNIT HOUSING FOR REARVIEW MIRROR

FIELD OF THE INVENTION

This invention relates to an actuator unit housing for use in a rearview mirror of the type for automatically adjusting the angle of the mirror under a remote control.

DESCRIPTION OF THE PRIOR ART

A rearview mirror mounted outside a motor vehicle for adjusting the angle of reflection of the mirror from the interior of a compartment has been known. An actuator unit fixed to a mirror body has two electric motors for adjusting the angle or reflection of the mirror at both vertical and horizontal angles, and a drive transmission. Supporting means for tiltably supporting a mirror element is provided at the center in the rear housing of the actuator unit. The supporting means has movable pivots at positions disposed at a predetermined distance in a direction crossing at a right angle from the center at the supporting means. When the electric motor is driven, either one or both of the movable pivots is axially movable back and forth through the drive transmission to tilt the mirror element at the supporting means as a center.

Recently, a collapsible function to narrow the width of a vehicle by folding rearview mirrors projected outward from the vehicle is required at parking or shipping time separately from the tilting function of the mirror element as described above. The collapsible function is largely classified to a manual type and a remote controlled electric motor operated type. In the manual collapsible type, a harness line guided by a control switch in a compartment is fed into a hollow shaft stood on a base through the base of a mirror assembly, inserted into a harness guide inlet of the actuator directly from the upper end of the hollow shaft, and connected to a tilting electric motor. In the remote controlled electric motor operated type, a harness line guided through a hollow shaft to the upper end of the hollow shaft similarly to the manual type is divided into two groups, one of which is connected directly to the electric motor of an electric motor operated tilting unit, and at the end of the other of which the socket member of a small-sized connector is mounted. This socket member is engaged with a connector pin inserted into the harness guide inlet of an actuator unit housing, and the harness line is thus connected to the tilting motor.

As described above, in the structure that the mirror body is tilted manually, a collapsible electric motor is not provided. Thus, the harness line connected to the tilting electric motor disposed in the actuator unit may be led into the compartment as it is to be connected to a control switch, but in the actuator unit of the electric motor operated collapsible type, the slit of the harness guide is used for mounting the socket member of the connector. Thus, the width is so narrow that the socket unit may not drop when the connector pin is attached or detached, the harness cannot bend fed therethrough, the harness must be cut in the unit and must be connected by using a connector, resulting in an expensive cost.

SUMMARY OF THE INVENTION

It is therefore an object of this invention to provide an actuator unit housing for a rearview mirror in which a harness line can be smoothly connected in both manual collapsible type and remote controlled electric motor operated collapsible type.

In order to achieve the object of the invention and to overcome the problems of the prior art, this invention forms a plurality of separate members toward a guiding direction in the harness guide inlet of an actuator unit housing to form a plurality of slits with labyrinths at the separate members at the sidewall of a guide outlet. The electric supply and control harness line for a tilting electric motor inserted into the guide inlet is tightly held by the labyrinths in the slots so that the line may not be removed nor displaced.

Since recesses and projections are formed in the passage of the harness guide inlet, a terminal or the harness may not be removed but can be rigidly secured by engaging the terminal of the harness or the harness.

BRIEF DESCRIPTION OF THE DRAWINGS

A preferred embodiment of the invention is set fourth in the following description and shown in the drawings and is particularly and distinctly pointed out and set fourth in the appended claims.

FIG. 1 is a sectional view of a rearview mirror according to a preferred embodiment of the present invention;

FIG. 2 is an enlarged sectional view of an actuator unit housing;

DESCRIPTION OF THE PREFERRED EMBODIMENTS

Figure 3:
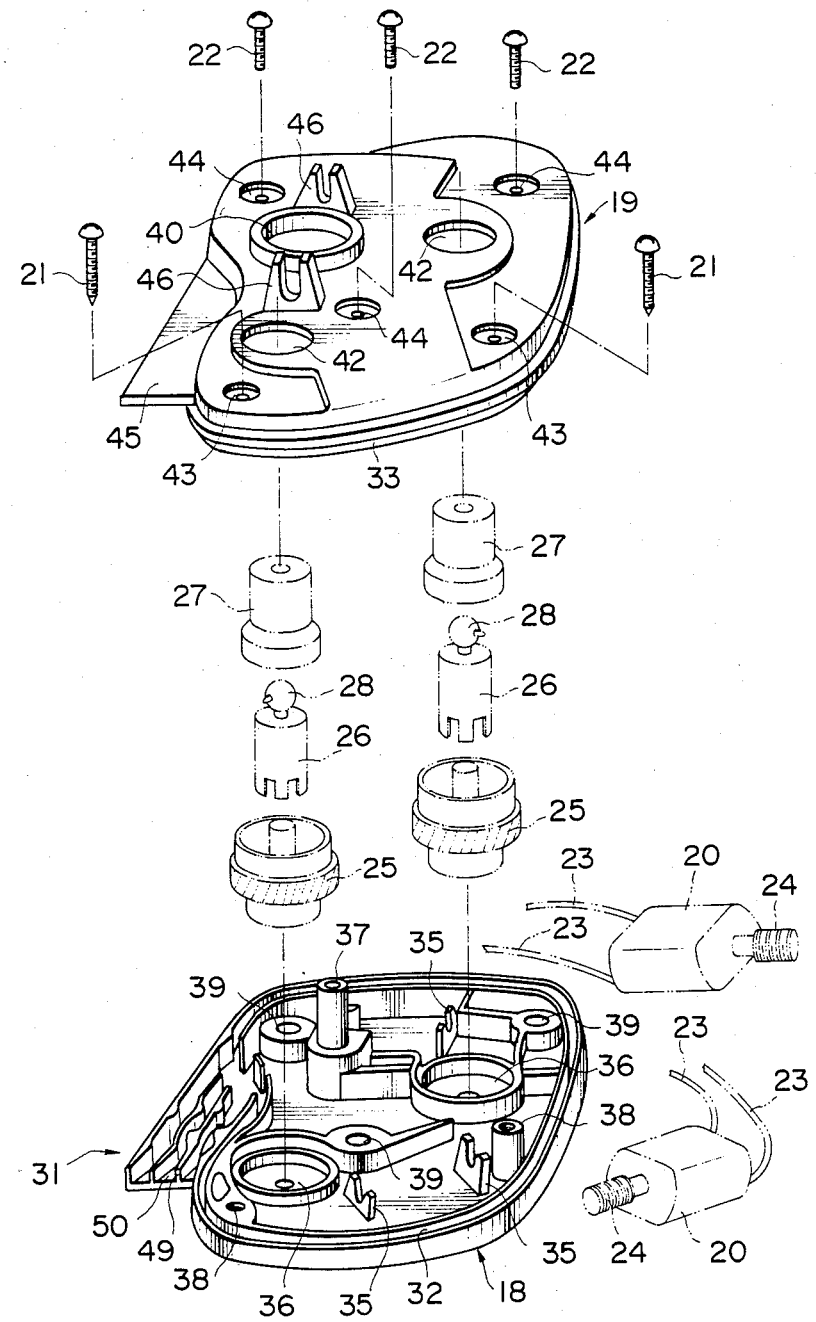
FIG. 3 is an exploded disassembling and assembling view enlarged plan view partly cutout of the actuator unit housing.

A remote controlled electric motor operated mirror assembly 10 is shown in FIGS. 1 and 2, embodying the present invention.

The assembly 10 includes a mirror body 11 rotatably mounted on a base, an actuator unit 12 set in said mirror body 11, and a mirror element 13 mounted adjustably at a tilting angle in front of the actuator unit 12. The mirror element 13 has a mirror plate 14, and a mirror holder 15 for holding the mirror plate 14. An opening 16 is opened at the center of the mirror holder 15, and a pivot plate 17 is detachably mounted.

The actuator unit 12 is constructed, as shown in FIGS. 2 and 3, to separably engage a front housing 18 and a rear housing 19, and has therein two sets of electric motors 20, a worm 24 for forming a drive transmission, and a worm wheel 25. At the center of the rear housing 19 is provided a double socket-type supporting means 30 to tiltably support the mirror element 14. In the actuator unit 12, both the housings 18 and 19 are integrated by two screws 21, 21, and the housings thus integrated are further fixed by another screws 22, 22 to the mirror body 11 or a base plate. The worm wheel 25 of the drive transmission is disposed in the housing at a position separated at a distance at a right angle with the supporting means 30 as a center. An adjusting nut 26 with a dust cover 27 is attached to each worm wheel 25, and a pivot 28 provided at the end of the adjusting nut 26 is engaged with a spherical seat 29 formed on the back surface of the pivot plate 17 (FIG. 1). When any of the electric motors is normally or reversely rotated, the adjusting nut 26 moves back and forth through the drive transmission, and the angle of reflection of the mirror is adjusted at vertical or horizontal angle.

A groove 32 is formed on the peripheral edge of the front housing 18 except the guide inlet 31 of the harness line 23, a peripheral projecting strip 33 is formed on the periphery of the rear housing 19 corresponding to the groove 32 of the front housing 18. When both the housings are superposed, the groove 32 and the projecting strip 33 are engaged to form a unit housing. As shown in FIG. 3, electric motor mounting brackets 35, 35, worm wheel mounting recesses 36, 36, a threaded cylinder 37 for supporting means set, a tapping hole 38 of the screw 21, through-hole 39 of the screw 22, and a harness line guide inlet 31 are provided in the front housing 18. The rear housing 19 has a mounting hole 40 of the supporting means 30, an adjusting nut passing hole 42 and holes 43, 44 for passing the screws 21, 22, and a cover 45 is extended to a predetermined position on the upper surface of the harness guide inlet 31. Mirror element anti-rotation brackets 46, 46 are projected from the outer surface of the housing near the mounting hole 40, recesses for engaging the upper peripheral surfaces of the worm wheels 25, 25 are formed at the positions corresponding to the recesses 36, 36 of the front housing on the inner surface thereof, and a pressor (not shown) for lightly pressing the top of the electric motor is also formed.

Figure 4:
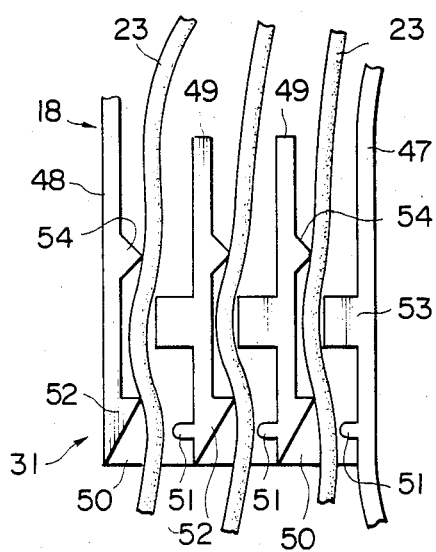
FIGS. 4 and 5 are enlarged plan views of a harness guide inlet in the housing.

The harness line guide inlet 31 has, as shown in FIG. 4, three slits 50 by the lateral alignment of inner and outer walls 47, 48, two partition walls 49, 49. Each slit 50 has a plurality of projections on the right and left side walls to form a labyrinth therein. In other words, a first projection 51 of small size and a third projection 53 of large shape are formed from the inlet toward the depth on the right side wall of each slit 50, and a second projection 52 of a right-angled triangular shape and a fourth projection 54 of an equilateral triangular shape are formed by displacing from the projections 51, 53 at the left side.

When assembling the actuator unit 12, the electric motor 20, the worm wheel 25, the adjusting nut 26, and the dust cover 27 are set in the front housing 18, the harness line 23 of each motor 20 is inserted into the slit 50 of the guide inlet 31, the rear housing 19 is then engaged, and clamped with the screws.

As described above, there are two types of the collapsible door mirror. In the actuator unit of the manual collapsible type door mirror, the harness line 23 connected to the electric motor 20 as shown in FIG. 4 may be fed along the labyrinth in each slot 50 while slightly bendihg, and the rear housing 19 may be immediately clamped fixedly. Since each harness line 23 inserted into the guide inlet 31 is held in the state bent by the slit 50 of the labyrinth, even if it is pushed or pulled in the longitudinal direction of the harness line, it is not removed.

Figure 5:
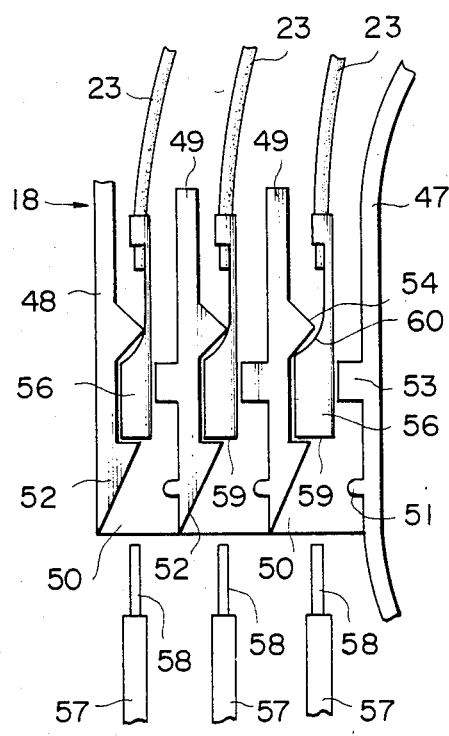

In addition, in an electric motor operated collapsible type door mirror as disclosed, for example, in U.S. Pat. Nos. 4,626,083 and 4,626,084, the harness line 23 guided in advance from the motor 20 side is cut in a predetermined length, a connector socket 56 is fixed to the end as shown in FIG. 5, and the male piece 58 of the connector fixed to the end of the line 57 guided from the control switch side may be inserted. The socket 56 is fixed at its upper end from the tilting electric motor 20 to the line 23, and increased in width at the lower half portion toward the downward as a socket body, and the edges are so bent oppositely as to be formed in a U-shaped cross section. The lower end 59 of the wide body is contacted with the vertical side of the projection 52 in the slit 50, the oblique side 60 formed from the wide body toward the root is contacted with the oblique side of the fourth projection 54, and when the male connector piece 58 is resultantly telescoped in the socket 56, it is tightly held in the slit so as not to move.

What is claimed is:

1. A rearview mirrow device, comprising:
   a base;
   a mirror element with a reflecting surface;
   a mirror body supported on said base;
   an actuating unit means secured fixed by within said mirror body, said actuating unit including means for tiltably supporting said mirror element, driving means for tilting said mirror element and a housing enclosing said driving means; and
   guiding means for guiding at least one line to said driving means and including a plurality of labyrinths leading said driving means,
   said housing including a rear housing and a front housing engaging each other,
   said guiding means being formed as labyrinth type guide inlets so as to constitute said plurality of labyrinths, said guide inlets including a plurality of lateral slits formed in said front housing, said slits having sidewalls with projections extending therefrom at predetermined intervals, said projections being disposed at positions displaced longitudinally of said slits,
   said line is extendable in a bent manner through said lateral slits to said driving means.

2. The device as defined in claim 1, wherein, said driving means further including two sets of mirror tilting electric motors, an adjusting nut with a movable pivot, and a drive transmission, said guiding means being formed as labyrinth-type guide inlets so as to constitute said plurality of labyrinths, said guide inlets having an upper surface and being formed in said front housing for inserting a supply and control line of said sets of motors therethrough, said housing further including a cover extending over said upper surface of said guide inlets from a side of said rear housing.

3. The device as defined in claim 1, wherein said driving means includes two electric motors and drive transmission means responsive to said two electric motors for tilting said mirror element, said means for tiltably supporting said mirror element being arranged to tiltably support said mirror element substantially at a center of said mirror element.

4. The device as defined in claim 3; further comprising the line which is formed as a harness line for controlling a drive of said electric motors.

5. The device as defined in claim 1; and further comprising:
   a housing enclosing said electric motors, said housing including a rear housing and a front housing engaging each other, said tiltably supporting means being formed at a center of said rear housing, said drive transmission means including two drive transmissions disposed in said housing and spaced apart from each other so as to define a right angle, said drive transmission further including two adjusting nuts movable back and forth at respective centers of said two drive transmissions.

6. The device as defined in claim 1, wherein said projections on one of said sidewalls have a triangular shape.

7. The device as defined in claim 1, wherein said slit defines an opening with an end, said triangular projections being formed to have a right-angled triangular cross-section with sides extending toward said end of said opening.

8. The device as defined in claim 1, wherein said labyrinths are formed to hold the line into position.

9. A rearview mirror device, comprising:
   a base;
   a mirror element with a reflecting surface;
   a mirror body supported said base;
   means for foldably supporting said mirror body and including an electric motor operated foldable door mirror and gear box in said mirror body;
   an actuating unit means secured fixed by within said mirror body, said actuating unit including means for tiltably supporting said mirror element, driving means for tilting said mirror element and a housing enclosing said driving means; and
   guiding means for guiding at least one line to said driving means and including a plurality of labyrinths leading to said driving means,
   said housing including a rear housing and a front house engaging each other,
   said guiding means being formed as labyrinth type guide inlets so as to constitute said plurality of labyrinths, said guide inlets including a plurality of lateral slits formed in said front housing, said slits having sidewalls with projections extending therefrom at predetermined intervals, said projections being disposed at positions displaced longitudinally of said slits,
   said line is extendable in a bent manner through said lateral slits to said driving means.

10. The device as defined in claim 9, wherein said labyrinths are to hold the line into position.

11. The device as defined in claim 9; and further comprising;
   the line, the line having an end; and
   a connector socket at said end of the line, said connector socket being arranged in one of said slits.

* * * * *